Patented Dec. 25, 1945

2,391,745

UNITED STATES PATENT OFFICE 2,391,745

CHLORINATION OF PYRAZINE

John M. Sayward, Stamford, Conn., assignor to American Cyanamid Company, New York, N. Y., a corporation of Maine No Drawing. Application August 8, 1944, Serial No. 548,627

3 Claims. (Cl. 260—250)

The present invention relates to the chlorination of pyrazine. More particularly, it relates to the preparation of mono-chloropyrazine at high temperatures in the presence of water vapor.

The compound, mono-chloropyrazine, is useful as an intermediate in the preparation of 2-aminopyrazine. The mono-chloropyrazine is also useful as an intermediate in the preparation of the therapeutically active sulfonamide, 2-sulfanilamidopyrazine.

It has been known in the past that benzene can be halogenated with chlorine or bromine comparatively easily at room temperature. It has also been known that pyridine, a heterocyclic liquid compound, can be chlorinated or brominated in the vapor phase at relatively high temperatures in the presence of a catalyst to give mixtures of mono-, di-, and tri-halogenated pyridines. Pyrazine, on the other hand, cannot be successfully chlorinated or brominated by treatment with halogens at ordinary temperatures. In actual experiments it was found that chlorine reacted with solid pyrazine at room temperature to give very largely carbonaceous materials, indicating that the chlorine has a destructive action upon pyrazine and that no chlorination took place. Similarly, in experiments wherein chlorine was passed through pyrazine, only decomposition products were obtained.

In accordance with the present invention it has been discovered that mono-chloropyrazine can be produced in good yields by reacting chlorine in the vapor phase with pyrazine, also in the vapor phase, in the presence of water vapor at a temperature of from about 300° to 600° C., preferably from about 375° to 475° C.

In my preferred method the pyrazine is dissolved in water before vaporization. The dissolving of the organic substance in water before vaporization and subsequent halogenation is unusual and has many advantages. The pyrazine-aqueous mixture can be easily vaporized and fed into a reaction zone, such as an empty tube, where the chlorination takes place. The product is easy to separate from the condensed aqueous medium. There is a decrease in the formation of tar and carbonaceous material during the reaction and subsequent to the reaction.

A further advantage in having water vapor present is that it acts as a diluent for the reactant vapors and subsequently aids in the condensation of the reaction products and in washing down the walls of the receiving vessel. When using non-condensible diluents such as nitrogen, a fog is obtained in the reaction vessel which is not easily condensed. Also, when using such diluents as carbon tetrachloride and nitrogen, large amounts of tar may be obtained. The use of water vapor obviates these disadvantages.

It is indeed surprising that mono-chloropyrazine is obtained by the vapor-phase chlorination process described above. Theoretically, pyrazine could combine with chlorine to give a mono-, di-, tri-, or a tetra-chloro-substituted pyrazine. It has been seen in the case of pyridine that mixtures of mono-, di-, and tri-substituted chlorinated products are obtained. It is unexpected, therefore, that in the case of pyrazine the principal product obtained by reacting chlorine with an aqueous solution of pyrazine in the vapor phase under the preferred process of the present invention is mono-chloropyrazine.

The reaction of chlorine and pyrazine is an exothermic reaction and at the point where the gases come into contact in the reaction zone, heat is liberated. The reaction is very rapid, and if the vapors are mixed at the higher temperature ranges, much heat is liberated and the temperature of the reaction rises spontaneously and may become too high. This may be avoided by mixing the vapors at lower temperatures and allowing longer contact times. While the contact time found best suited under certain conditions was 0.19 to 0.25 second, contact times ranging from 0.1 to 10.0 seconds, or even more, can be used successfully. Of course, the longer contact times are used with the lower temperatures.

It was found that a very pure product can be obtained by this method. The 2-chloropyrazine separates as an oil from the aqueous mixture. It can be recovered by mechanical or solvent extraction means and subsequently distilled. The wide range of boiling points between 2-chloropyrazine (B. P. 153–154° C.) and pyrazine (B. P. 115–116° C.) makes possible separation of a pure product by distillation.

It is a further advantage of the invention that no catalyst is necessary which would necessitate reactivation or replacement from time to time.

The invention will be described in greater detail in conjunction with the following specific examples which, however, are merely illustrative of the preferred methods of the present invention.

*Example 1*

A suitable apparatus for carrying out the reaction comprises separate heating means for vaporizing the reactants and a heated reaction tube through which the mixed vapors are passed.

During 120 minutes 33.6 cc. of a 33.5% aqueous solution of pyrazine was vaporized at 200° to 300° C. and allowed to mix with gaseous chlorine preheated to about 300° C. as it entered a small empty tube (17 ml. net volume). The rate of feed of pyrazine was 0.28 ml. per minute, and the rate of chlorine addition was such that the vapors in the reaction zone contained 0.05 mol fraction of pyrazine vapor, 0.45 mol fraction of water vapor, 0.06 mol fraction of chlorine, and the balance nitrogen. The reaction zone in the tube was maintained at a temperature of 500° C., and the reaction hot-spot was about 565° C. Two layers were obtained in the receiving flask: one, a mixture of oil (largely chloropyrazine); the other, water and hydrochloric acid. The oil was separated mechanically. The aqueous layer was neutralized with anhydrous potassium carbonate and extracted with benzene. The oil and the benzene extract were combined and fractionally distilled. The fraction boiling at 130°-158.5° C. (uncorrected) ($n_D^{25}$=1.536) corresponded to a yield of 64% of 2-chloropyrazine $$(n_D^{25}=1.538\pm0.002)$$

While in the above example pyrazine was dissolved in water, it is understood that pyrazine, water, and chlorine can be separately heated and admitted to the reaction tube. In the best method of carrying out my invention it is desirable to have the water vapor mix with one or both reactants before they enter the reaction tube. This can be most easily accomplished by dissolving the pyrazine in water before vaporization as stated above.

Example 2

A solution consisting of 112 grams of pyrazine (1.4 mols) dissolved in 272 grams of water (15 mols) was vaporized and mixed with 54 grams of chlorine (0.76 mol) at 350° C. and passed into a glass tube having the reaction zone heated to 500° C. The time of contact of the reactants in the reaction zone at a temperature of 400-500° C. was 2.4 seconds. The time required for passing the entire quantity through the reaction zone was 5 hours. 25 grams of pyrazine and 62 grams of chloropyrazine were obtained by an extraction of the crude product with benzene and fractionation of the extract. The yield of the chloropyrazine was 70%, based upon the weight of the unrecovered pyrazine.

Example 3

A solution consisting of 110 grams of pyrazine (1.37 mols) in 110 grams of water (6.1 mols) was vaporized and mixed with 86 grams of chlorine (1.2 mols) at a temperature of 350° C. and passed into the reaction zone at 450° C. over a period of 3½ hours. The time of contact of the materials in the reaction zone was 3.0 seconds. 92 grams of chloropyrazine and 20 grams of non-reacted pyrazine were recovered. The yield of chloropyrazine was 72%, based upon the unrecovered pyrazine.

Example 4

A solution consisting of 205 grams of pyrazine in 205 grams of water was vaporized and allowed to mix with 213 grams of chloride in a stainless steel tube at 400° C. The time of contact of the reactants in the reaction zone at 400° C. was 8 seconds. The time of passage of the materials through the tube was 3 hours. 55 grams of pyrazine and 160 grams of chloropyrazine were recovered, the yield thus being 77%, based on the weight of the pyrazine consumed.

Under the preferred conditions of my process the vapors in the reaction zone should contain about 0.04 to 0.3 mol fraction of pyrazine, about 0.4 to 0.92 mol fraction of water, and about .04 to 0.3 mol fraction of chlorine. In general, the chlorine-pyrazine mol ratio should be from about 0.4 to 1.3 mols of chlorine to each mol of pyrazine. Nitrogen or other diluent may also be used, but as pointed out above the use of diluents other than water is neither necessary nor desirable. Of course, if diluents are used the mol fractions given above will also vary.

This is a continuation-in-part of my copending application Serial No. 505,193, filed October 6, 1943.

I claim:

1. In a method of making 2-chloropyrazine the steps which comprise reacting in vapor state a mixture of chlorine and pyrazine in the presence of water vapor at a temperature between 300° and 600° C. for a time sufficient to form 2-chloropyrazine and insufficient to cause decompositions and recovering the thus formed 2-chloropyrazine.

2. In a method of making 2-chloropyrazine the steps which comprise vaporizing an aqueous solution of pyrazine, mixing said vapor with chlorine, heating the mixed vapors at a temperature within the range of 300° to 600° C. for a time sufficient to form 2-chloropyrazine and insufficient to cause substantial decomposition of the product and recovering the thus formed 2-chloropyrazine.

3. In a method of making 2-chloropyrazine the steps which comprise forming a mixture of the vapors of chlorine, pyrazine, and water, heating said mixture at a temperature within the range of 300° to 600° C. for a time of from 0.1 second to 10 seconds whereby 2-chloropyrazine is formed, said time being insufficient to cause substantial decomposition of the product, and thereafter recovering the thus formed 2-chloropyrazine.

JOHN M. SAYWARD.